United States Patent
Shih et al.

(10) Patent No.: US 7,171,800 B2
(45) Date of Patent: Feb. 6, 2007

(54) EXHAUST GAS SYSTEM AND METHOD OF DIRECTING A FLOW OF EXHAUST GAS OF A VEHICULAR INTERNAL COMBUSTION ENGINE

(75) Inventors: Shan Shih, Troy, MI (US); Egon Hassel, Rostock (DE); Johannes Hartick, Annes (GB); Winfried Willeke, Attendorn (DE); Claus Gellermann, Stadthagen (DE); Jose-Luis Eguizabal, Navarra (ES); Gregg Speer, Dachau (DE); Markus Engelbertz, Attendorn (DE)

(73) Assignee: Arvin Technologies, Inc., Troy, MI (US)

( * ) Notice: Subject to any disclaimer, the term of this patent is extended or adjusted under 35 U.S.C. 154(b) by 0 days.

(21) Appl. No.: 10/951,412

(22) Filed: Sep. 28, 2004

(65) Prior Publication Data

US 2005/0160722 A1    Jul. 28, 2005

(30) Foreign Application Priority Data

Oct. 6, 2003    (DE) .............................. 103 46 345

(51) Int. Cl.
*F01N 3/00*    (2006.01)
*F01N 3/10*    (2006.01)

(52) U.S. Cl. ............................ 60/288; 60/286; 60/287; 60/300; 60/303

(58) Field of Classification Search .................. 60/282, 60/286, 287, 288, 299, 300, 301, 303
See application file for complete search history.

(56) References Cited

U.S. PATENT DOCUMENTS

| 4,817,385 A | * | 4/1989 | Kumagai | ...................... 60/288 |
| 5,250,268 A | * | 10/1993 | Geiger | ........................ 422/174 |
| 5,517,820 A | * | 5/1996 | Kuroda et al. | ................. 60/274 |
| 5,746,042 A | * | 5/1998 | Lombardi | ..................... 53/305 |
| 5,746,052 A | * | 5/1998 | Kinugasa et al. | ............. 60/274 |
| 5,987,885 A | * | 11/1999 | Kizer et al. | ................... 60/298 |
| 6,871,489 B2 | * | 3/2005 | Tumati et al. | ................. 60/285 |

* cited by examiner

*Primary Examiner*—Thomas Denion
*Assistant Examiner*—Loren Edwards
(74) *Attorney, Agent, or Firm*—Barnes & Thornburg LLP

(57) ABSTRACT

An exhaust gas system of a vehicular internal combustion engine comprises a plurality of exhaust gas catalytic converters having different working temperature ranges. Depending on the temperature of the exhaust gas the latter is directed to the one or those converters into whose working temperature range the exhaust gas temperature falls.

14 Claims, 3 Drawing Sheets

EXHAUST GAS SYSTEM AND METHOD OF DIRECTING A FLOW OF EXHAUST GAS OF A VEHICULAR INTERNAL COMBUSTION ENGINE

This application claims priority under 35 U.S.C. § 119 to DE 10346345.3 which was filed in the Federal Republic of Germany on Oct. 6, 2003 and is hereby incorporated by reference herein.

FIELD OF THE DISCLOSURE

This application relates to an exhaust gas system for a vehicular internal combustion engine and a method of directing a flow of exhaust gas.

BACKGROUND OF THE DISCLOSURE

With modern internal combustion engines, there are commonly used catalytic converters in order to keep the amount of harmful substances in the exhaust gas as low as possible. The efficiency of the converter crucially depends on the fact that the converter is at its operating temperature. This temperature lies above 250° C. with the materials that are common at present. So that the converter reaches its operating temperature after a cold start of the internal combustion engine in the shortest possible time, various ways have been proposed in prior art, for instance by arranging it as close as possible to the internal combustion engine, so that the exhaust gas hardly cools down before it reaches the converter and can heat the latter up. However, the heating up of the converter which is rapidly achieved in this manner necessarily involves the risk of the converter becoming overheated if the internal combustion engine is operated at high power for a longer time or at full load. The exhaust gas which then will enter the exhaust gas chamber with high temperature can in fact only cool down very little before it reaches the converter. A further disadvantage is that with high temperatures the converter operates outside its optimum performance range and the catalytic action is diminished. Moreover, costly materials and expensive constructions are necessary due to the high temperatures. Hitherto, materials such as Pt, Rh and Pd (typical materials in a conventional three-way converter) are used in the converters. These materials serve for reducing the emission of CO, HC and $NO_x$. The materials employed in the converters are additionally very costly and the converter is so heavily stressed through an operation outside its working temperature range—in which it has its optimum catalytic effect—that it would age prematurely. In order to exclude this, additional fuel serving for cooling the exhaust gas is injected at present when there are high operating temperatures. This, however, significantly increases the consumption with high load.

SUMMARY OF THE DISCLOSURE

According to the present disclosure, an exhaust gas system and a method of directing a flow of exhaust gas promote a long service life of the converters, a low emission of harmful substances after a cold start and at full load, as well as a reduced fuel consumption at full load.

According to an aspect of the present disclosure, there is provided an exhaust gas system of a vehicular internal combustion engine which has an exhaust gas conduit emanating from the side of the engine and a plurality of exhaust gas converters arranged in the exhaust gas conduit and having different working temperature ranges. There is further provided at least one pilot valve which, at least after a warm-up phase for the converters and depending on the temperature of the exhaust gas, directs the exhaust gas to the one or those converters into whose working temperature range the exhaust gas temperature falls.

The exhaust gas system makes provision that the converter, which hitherto worked in an as broad a working temperature range as possible, is subdivided into converters working in different and narrow temperature ranges, which are not acted upon with exhaust gas all at the same time, but—at least in a specific performance range—are acted upon whenever the current exhaust gas temperature falls into an associated, narrower working temperature range. The converters not involved are exemplarily not stressed at all or at least are stressed to a lesser extent and have a longer service life. However, exemplarily, there is a short-term flow of exhaust gas through the converters not involved, as is provided by the method which will be explained later, so that they can be kept (at least approximately) at their working temperature level. In case that this converter or these converters are called on to permanently clean the exhaust gas, then the converter concerned is instantly in its working temperature range. In fact, one needs more converters than in prior art, but the materials and the expenditure for producing these converters are reduced, because the demands made on the durability in extreme temperature ranges are smaller and the material employed may be cheaper. At full load it is possible to hook up a converter which is suitable to work well at the existing high temperatures, so that a smaller amount of additional fuel or no additional fuel at all is to be injected into the exhaust gas purely for cooling purposes.

The exhaust gas converters are exemplarily arranged in serial connection and at least one exhaust gas converter can be bypassed by means of an associated exhaust gas bypass. The pilot valve directs the exhaust gas to the bypass and/or to the associated exhaust gas converter in a manner so as to be temperature dependent. Through the bypass solution it is possible to bypass the exhaust gas converter and to cool the gas at the same time.

The arrangement of the exhaust gas converters is exemplarily selected such that the converters have increasing working temperature ranges in the direction of flow. This provides the possibility to cool the exhaust gas to a great extent in advance via the bypass systems.

At least three exhaust gas converters should be arranged in serial connection, as is shown by an illustrative embodiment; each of these should have a bypass associated to it, with the exhaust gas (with the above mentioned exception in terms of short-time warm-up phases) being only directed through the one or those converters into whose working temperature range the exhaust gas temperature falls.

The converters which are graduated in their working temperature ranges should have overlapping limiting value ranges, so that a smooth transition is ensured during switching from one converter to the next.

The different working temperature ranges of the converters are exemplarily achieved by different catalytic coatings.

It is not always possible and of advantage if only those converters are in operation, into whose working temperature range the current exhaust gas temperature falls. For instance during a cold start, when the vehicle operating temperature is not yet reached and still no converter at all would be suitable for exhaust gas reduction, the main concern should be the quick heating up of one or more converters.

One embodiment makes provision that a control system is provided for the pilot valve(s), which after a cold start directs the exhaust gas through all converters, until a specific temperature is reached in the converter and/or in the exhaust gas. This idea aims at quickly heating up all converters, if possible, irrespectively of the fact that in the heating-up phase, when exhaust gas flows through all converters, not all converters can be brought up into the operating temperature range that would be the optimum for them. Those converters which are not heated up to a sufficient extent are at least pre-heated and will reach their operating temperature in a shorter time.

An alternative to the serial connection is a parallel connection of the converters; here too, at least three converters possessing different working temperature ranges should be provided, in order to achieve an effective subdivision of the entire exhaust gas temperature spectrum.

A further measure for reducing the consumption and for the reduction of the exhaust gas is to associate a preceding exhaust gas temperature controlling device to at least one converter, exemplarily at least to the first converter. Such controlling device consists of two parallel line sections, a cooling device being provided in a first line section and a heating device being provided in a second line section. After the cold start, the exhaust gas at least for the major part will be directed through the second line section including the heating device, in order to bring the exhaust gas and the downstream converter to the operating temperature as quick as possible. In case the exhaust gas temperature becomes extremely high, then at least a major part of the exhaust gas amount is directed through the first line section where it is cooled.

It would also be possible to provide a plurality of exhaust gas temperature controlling devices in series connection, to increase the cooling or heating power or to be able to control the exhaust gas temperature within narrow limits.

The cooling device exemplarily is a heat exchanger which can be integrated in a separate cooling circuit, or exemplarily, in the cooling water circuit of the engine.

Options for configuring the heating device include an electrical heating device, a thermal storage heating device which is capable of storing the waste heat of the engine for several hours for a later cold start, or a separate, preceding converter. In fact, a converter will be heated when exhaust gas flows through it and cools the latter.

According to another aspect of the present disclosure, a method of directing a flow of exhaust gas in an exhaust gas system of a vehicular internal combustion engine is provided. The system comprises an exhaust gas conduit emanating from the side of the engine, a plurality of exhaust gas converters arranged in the exhaust gas conduit, and at least one pilot valve. The method provides the following steps: the pilot valve is switched in such a manner that the exhaust gas is directed to the one of the converters into whose working temperature range the exhaust gas temperature falls. Intermediately, the one converter or those converters not currently used for exhaust gas cleaning are flooded with exhaust gas for a short time, in order to heat them up and bring them up to a temperature that at least approximates their working temperature. The aim is to keep, if possible, all converters after the start-up phase in their working temperature range, so that it is made possible to quickly change between the converters without having a degradation of the exhaust gas cleaning effect during switching.

The method may provide for advantages especially with high converter temperatures. If, for instance, the motor is stressed for a longer time at full load, the converter flooded with exhaust gas could become so hot that the so-called $NO_x$ trap would occur, in which the $NO_x$ reduction is greatly diminished. The method makes provision that the pilot valve is actuated as from reaching a predetermined temperature, as from which or close to which the $NO_x$ trap occurs, to direct exhaust gas to a cooler converter. The converter having been in operation before is then allowed to cool down, before it is again responsible for cleaning the exhaust gas, either alone or at least for the major part. In this context it would also be possible, of course, to act upon the converter, being too hot, with a smaller amount of exhaust gas to give it the chance to cool down while another converter cleans a larger amount of exhaust gas.

Exemplarily, the method makes provision that after the start-up phase (heating up of the engine and of at least one converter) the converters which are not currently involved in exhaust gas cleaning and therefore are not flooded with exhaust gas, are kept at working temperature by directing exhaust gas through them for a short time.

Further features and advantages of the invention will be apparent from the following description and the drawings.

BRIEF DESCRIPTION OF THE DRAWINGS

The detailed description particularly refers to the accompanying figures in which.

DETAILED DESCRIPTION OF THE DRAWINGS

Figure 1:
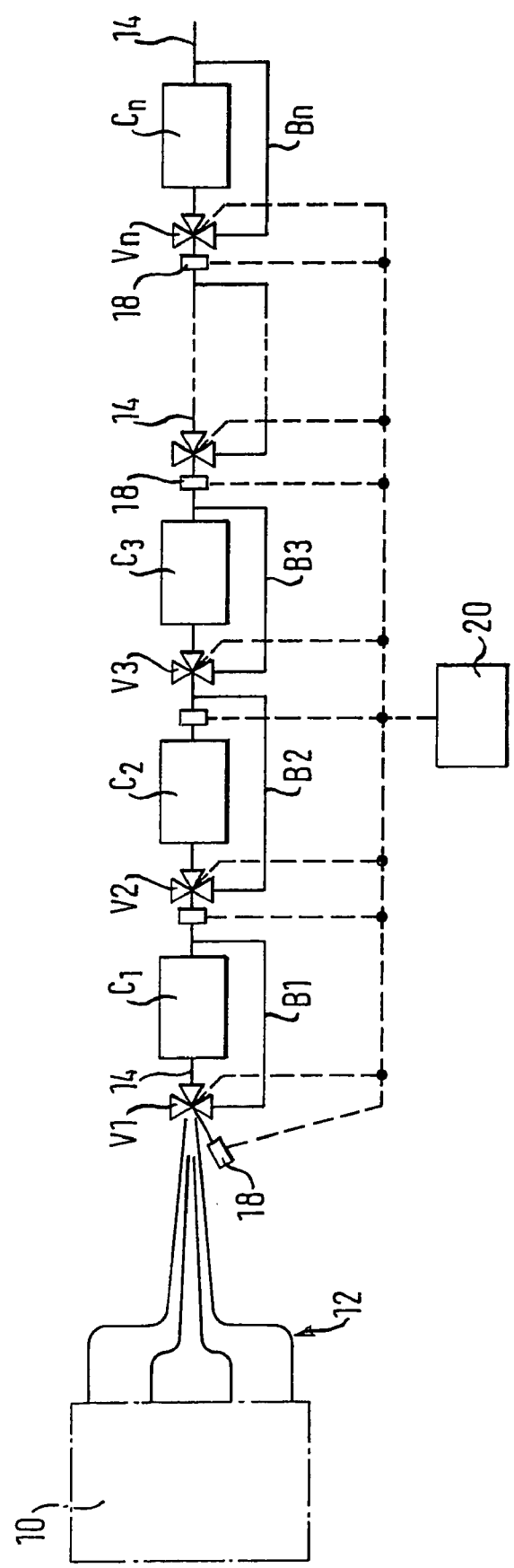
FIG. 1 is a schematic view of an exhaust gas system having more than three converters provided in serial connection.

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the invention as defined by the appended claims.

FIG. 1 illustrates an exhaust gas system of a vehicular internal combustion engine 10 which is driven with gasoline or diesel fuel. 12 designates the manifolds of an exhaust gas conduit in which a plurality of exhaust gas converters $C_1$, $C_2$, $C_3$ through $C_n$ are arranged. Arranged upstream of each converter is a pilot valve V1 through Vn associated to it, which valve directs the exhaust gas either via the exhaust gas main conduit 14 to the downstream converter $C_1$ through $C_n$ or into an associated exhaust gas bypass B1 through Bn. That is, each converter $C_1$ through $C_n$ has its own exhaust gas bypass B1 through Bn, which makes it possible to bypass the associated converter. Each bypass B1 through Bn opens into the exhaust gas main conduit 14, in fact before the following converter, exemplarily even before the pilot valve of the downstream converter, as is also illustrated in FIG. 1.

The converters $C_1$ through $C_n$ have graduated, relatively narrow working temperature ranges, with the arrangement of the converters $C_1$ through $C_n$ being made such that they are arranged so as to have increasing working temperature ranges in the direction of flow.

The converter $C_1$, for instance, has a working temperature range between 200 and 400° C., converter $C_2$ between 300 and 700° C., converter $C_3$ between 500 and 800° C. and converter Cn between 800 and 1200° C.

These different working temperature ranges are achieved by different catalytic coatings of the individual converters $C_1$ through $C_n$.

Each valve V1 has an upstream sensor 18 associated to it, which detects the exhaust gas temperature before reaching the valve V1 through Vn. All the valves V1 through Vn and all the sensors 18 are further coupled with an electric control system 20 which receives the measured temperatures and correspondingly addresses the valves V1 through Vn.

The mode of operation of the exhaust gas system as well as an associated method for cleaning the exhaust gas of an internal combustion engine will now be explained in the following.

During cold start of the engine the exhaust gas has a very low temperature and the converters $C_1$ through $C_n$ are not yet heated up to such a temperature that they can work in their working temperature range. The control system 20 addresses all valves V1 through Vn in such a manner that the exhaust gas flows along the exhaust gas main conduit 14 sequentially through all converters $C_1$ through $C_n$ and heats up the latter.

As from reaching a predetermined temperature of the exhaust gas, exemplarily measured by the first sensor 18, and/or depending on the temperature of one or more converters $C_1$ through $C_n$ individual valves V1 through Vn are addressed and switched over. If, for instance, the exhaust gas is still relatively cold, the exhaust gas will be directed through converter $C_1$ and perhaps also through the following converter $C_2$ as from reaching a predetermined temperature. At a downstream point, however, the exhaust gas is directed through the bypasses B3 through Bn, so that the associated converters $C_3$ through $C_n$ are out of function. It is also possible to direct some part of the exhaust gas through these converters, to keep them in the heated state.

When the exhaust gas temperature increases, the exhaust gas will flow past the first converter $C_1$ by addressing valve V1 and directing the gas via bypass B1. With still higher temperatures the exhaust gas can be directed past further converters.

As already explained above it can be beneficial to keep the bypassed exhaust gas converters at working temperature. In case it is determined, for instance, that the converters $C_1$ and $C_2$—which are not flooded with the exhaust gas—are so cold that they are below their working temperature, then the valves V1, V2 will be switched over for a short time such that a flow of exhaust gas, though for a short time, will run through the converters $C_1$ and $C_2$ and heat them up, so that they will be kept at least approximately, but exemplarily permanently at their working temperature.

At full load the exhaust gas is mainly cleaned in converter $C_n$. The latter, however, can become overheated. In order to avoid a decreasing of the $NO_x$ reduction, there will be a switching over to the converter $C_{n-1}$ as from reaching a predetermined temperature, so that the converter $C_n$ is relieved. In this connection it can be useful if at least the converters $C_{n-1}$ and $C_n$ have overlapping working temperature ranges. When converter $C_n$ has cooled down to a sufficient extent, it will again be acted upon with a large flow of exhaust gas or with the entire flow of exhaust gas.

Cooling devices can be accommodated in some or all bypasses B1 through Bn, to cool the exhaust gas at high temperatures and possibly to do away with a costly converter that works at very high temperatures. It would likewise be possible to arrange a heating device upstream of the first converter $C_1$, which serves for a quick heating up of the first converter $C_1$ and allows it to have a higher working temperature range.

Figure 2:
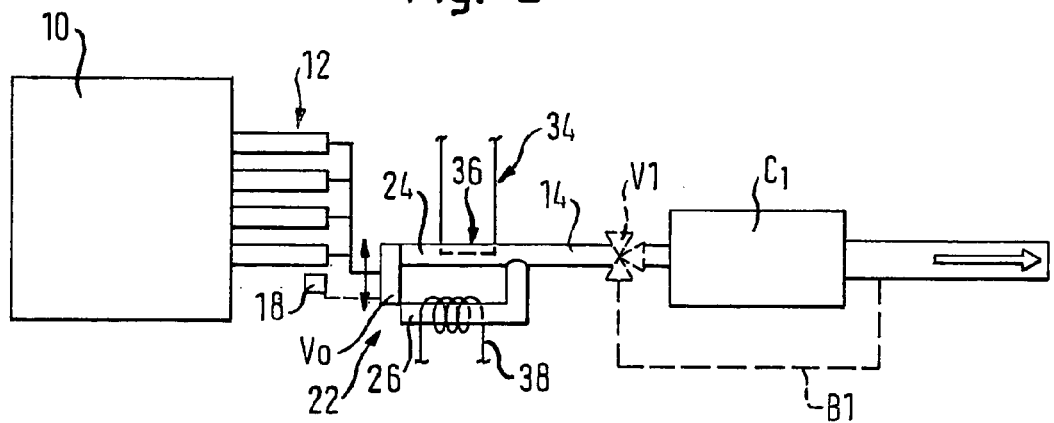
FIG. 2 is a schematic detail view of a second embodiment of the exhaust gas system.

The embodiment according to FIG. 2 employs a cooling device and, optionally, a heating device upstream of the first converter $C_1$ for changing the exhaust gas temperature prior to reaching converter $C_1$. An exhaust gas temperature controlling device is formed in that the exhaust gas conduit branches into a first line section 24 and a second line section 26 which are connected in parallel to each other. A cooling device 34 including a heat exchanger 36 as part of a cooling liquid circuit is provided in the first line section 34. As an alternative, the cooling device 34 can merely consist in that the first line section is not insulated and possibly provided with cooling fins to achieve a quick heat transport to the environment.

Arranged in the second line section 26 is a heating device 38 which can be an electrical heating device, a thermal storage heating device or even a preceding converter. In the latter case the exhaust gas when flowing through the converter is heated due to the reaction taking place therein. Arranged upstream of the line sections 24, 26 is a pilot valve V0 which can direct the exhaust gas into the first and/or second line sections 24, 26, as illustrated by the double arrow.

In case the heating device 38 is a converter, the first line section 24 acts as a bypass for this converter, corresponding to the mode of operation described in FIG. 1.

Arranged upstream valve V0 is a temperature sensor 18 already explained in the connection with FIG. 1, for controlling valve V0 as a function of temperature.

During cold start the entire exhaust gas is guided through the second line section 26 in order to heat it up in the heating device 38 and make it flow into the converter $C_1$ with an already relatively high temperature.

With extreme high exhaust gas temperatures, however, the entire exhaust gas will be guided through the first line section 24 to cool the exhaust gas.

For performing the method converter $C_1$ has a plurality of converters according to FIG. 1 arranged downstream of it. It is to emphasize that numerous of the above mentioned advantages with the embodiment according to FIG. 2 will already be achieved if valve V1 and the associated bypass B1 as well as the downstream converters $C_2$ through $C_n$ are dispensed with; this is why valve V1 and bypass B1 are illustrated in broken lines only.

Figure 3:
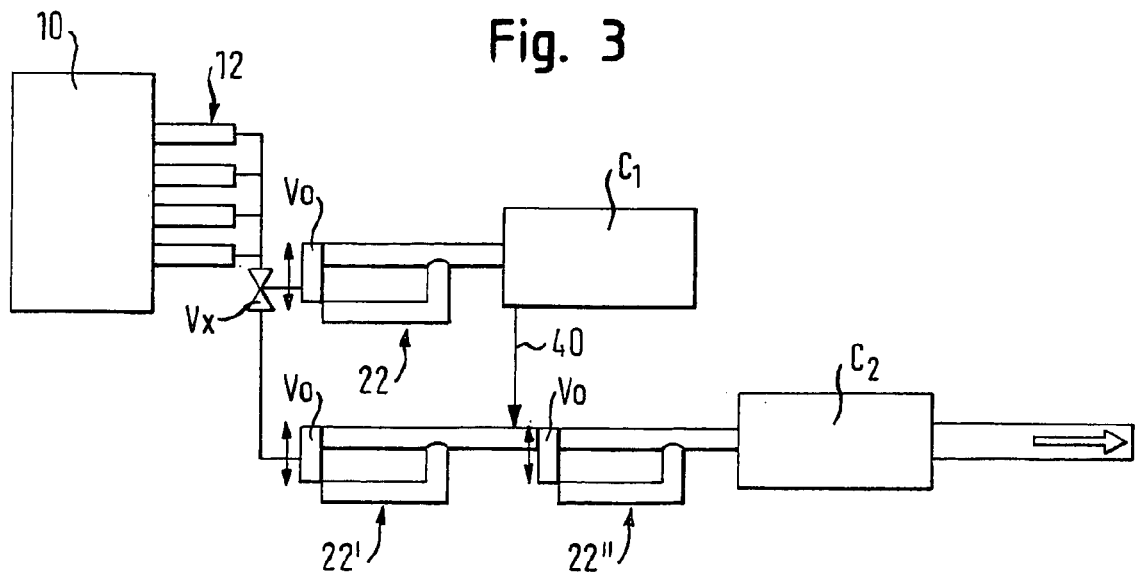
FIG. 3 is a schematic view of a third embodiment of the exhaust gas system.

With the embodiment of FIG. 3 the preceding valves V1, V2 associated to each converter $C_1$ and $C_2$ and the associated bypass lines B1, B2, just like optionally provided, further converters, have been omitted. These parts may be provided in the exhaust gas system according to FIG. 3, but not necessarily.

In the exhaust gas system according to FIG. 3, the exhaust gas conduit splits up in two parallel sections at a valve Vx provided directly downstream of the manifold 12. The upper section corresponds to the exhaust gas conduit of FIG. 2 with the exhaust gas temperature controlling device 22 and the downstream exhaust gas converter $C_1$.

Upstream of an associated converter $C_2$ the lower branch has two exhaust gas temperature controlling devices 22', 22" arranged in serial connection, which each are configured like the exhaust gas temperature controlling device 22 according to FIG. 2, so that the details with respect to valves, cooling and heating devices and design possibilities for the cooling and heating devices do not have to be explained in further detail here.

The two converters $C_1$ and $C_2$ have different working temperature ranges due to different coating materials, as was explained in the embodiment according to FIG. 1.

The two branches are connected through a line 40 which guides the exhaust gas downstream of converter $C_1$ into the lower branch, at a point upstream of valve V0 of the exhaust gas temperature controlling device 22". Depending on the exhaust gas and converter temperatures, a variety of cooling-, heating- and exhaust gas cleaning strategies can be performed by switching the corresponding valves.

Also with this embodiment it is true that some of the above mentioned advantages are already achieved if the valves V1 through Vn and the associated bypasses B1 through Bn are omitted. It would also be possible that the converters $C_1$ and $C_2$ have identical working temperature ranges. The solution described with the aid of FIG. 1 is the optimum also in this case.

The exhaust gas systems according to FIGS. 2 and 3 can be operated with the method in the realm of serial connection and also in the realm of parallel connection, which method makes provision that a converter not currently used for exhaust gas cleaning is acted upon with exhaust gas for a short period of time so as to at least approximately keep it at working temperature.

It is also possible with the systems according to FIGS. 2 and 3 that—as from reaching a predetermined temperature of an exhaust gas converter, from which its performance abruptly decreases—other converters are acted upon with exhaust gas to allow a cooling down of the converter that has become too hot.

In FIGS. 4a through 4h there are illustrated method steps of how to provide a tail pipe with a heating or cooling line. The heating- or cooling equipment consists of one or more tubes flooded with a heating or cooling fluid, which run transverse through the tail pipe at the tubing flange fastened to the engine block, or at places downstream of the flange.

Figure 4A:
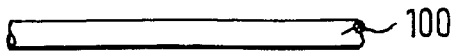
FIGS. 4a to 4h show various steps for manufacturing a tail-pipe with an integrated cooling or heating line.
Figure 4B:
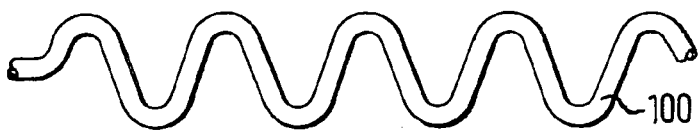
Figure 4C:
Figure 4D:
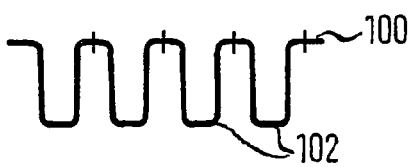
Figure 4E:
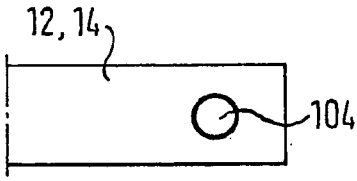

FIG. 4a illustrates a not yet deformed tube 100 made of a material which can be easily plastically deformed, for instance copper alloy. Such tube is given the shape of a meander (FIG. 4b). It is also possible to achieve the meander-like shape by hydroforming, according to FIG. 4c. The tube is then divided in several U- or Ω-shaped tube sections 102 by cutting the tube to pieces.

Figure 4F:
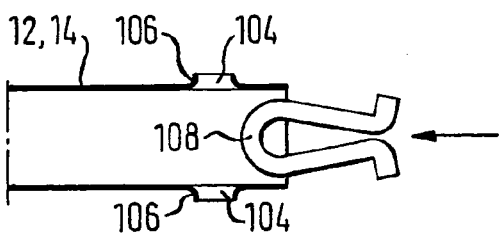
Figure 4G:
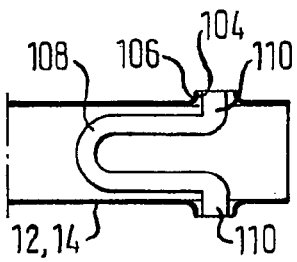

Parallel to this, reception holes 104 are made in the tail pipe at diametrically opposing places, e.g. in the manifold 12 or in the exhaust gas main conduit 14; in so doing, the tube wall is deformed at the reception holes 104 so as to become the shape of a rim 106 (see FIGS. 4e and 4f) projecting in outward direction. The U- or Ω-shaped tube section 108 is elastically compressed and pushed axially into the tube of the manifold 12 or of the exhaust gas main conduit 14 (FIG. 4f). Subsequently the tube section 108 is released and the ends 110 of the tube section 108 facing radially outwards snap in place in the reception holes 104 and are retained by the rim 106 (see FIG. 4g).

Figure 4H:
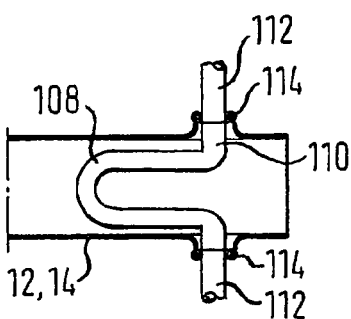

Finally the rims 106 and the ends 110 are welded to each other; the tubing connections 112 will likewise be welded or soldered with the ends 110. Corresponding weld seams or soldering spots are referenced by 114 (FIG. 4h). Through the fact that the tube section 108 runs through the tail pipe in an undulated manner, there is available a larger cooling or heating surface area when the exhaust gas flows along the tube section 108.

While the concepts of the present disclosure have been illustrated and described in detail in the drawings and foregoing description, such an illustration and description is to be considered as exemplary and not restrictive in character, it being understood that only the illustrative embodiments have been shown and described and that all changes and modifications that come within the spirit of the disclosure are desired to be protected.

There are a plurality of advantages of the concepts of the present disclosure arising from the various features of the systems described herein. It will be noted that alternative embodiments of each of the systems of the present disclosure may not include all of the features described yet still benefit from at least some of the advantages of such features. Those of ordinary skill in the art may readily devise their own implementations of a system that incorporate one or more of the features of the present disclosure and fall within the spirit and scope of the invention as defined by the appended claims.

The invention claimed is:

1. An exhaust gas system of a vehicular internal combustion engine, comprising
    an exhaust gas conduit emanating from the side of the engine and
    a plurality of exhaust gas catalytic converters arranged in the exhaust gas conduit and having graduated working temperature ranges with overlapping limiting values, as well as
    at least one pilot valve which, at least after a warm-up phase for the converters and depending on the temperature of the exhaust gas, directs the exhaust gas to the one or those converters into whose working temperature range the exhaust gas temperature falls.

2. The exhaust gas system according to claim 1, characterized in that the exhaust gas converters are arranged in serial connection and at least one exhaust gas converter can be bypassed by means of an exhaust gas bypass, the pilot valve directing the flow of exhaust gas to at least one of the exhaust gas bypass and the associated exhaust gas converter so as to be temperature dependent.

3. The exhaust gas system according to claim 1, characterized in that the exhaust gas converters are arranged in series and so as to have increasing working temperature ranges in the direction of flow.

4. The exhaust gas system according to claim 1, characterized in that at least three exhaust gas converters are arranged in serial connection and each of the exhaust gas converters has an associated exhaust gas bypass, the exhaust gas, at least after a warm-up phase for the converters, being directed through the one of the converters into whose working temperature range the exhaust gas temperature falls.

5. The exhaust gas system according to claim 1, characterized in that the exhaust gas converters have different catalytic coatings for achieving different working temperature ranges.

6. The exhaust gas system according to claim 1, characterized in that a control system is provided which addresses the pilot valves at least in a specific temperature range after a warm-up phase for the converters and prior to reaching a predetermined maximum temperature with high engine load in such a manner that the exhaust gas is directed to the one or those converters into whose working temperature range the exhaust gas temperature falls.

7. The exhaust gas system according to claim 1, characterized in that a control system is provided for the pilot valves which, after a cold start, directs the exhaust gas through all the converters until a specific temperature is reached in at least one of the exhaust gas and the converters.

8. The exhaust gas system according to claim 1, characterized in that for providing an exhaust gas temperature controlling device the exhaust gas conduit branches into at least two parallel line sections upstream of a first of the converters, a cooling device for the exhaust gas being provided in a first of the at least two parallel line sections and a heating device for the exhaust gas being provided in a second of the at least two parallel line sections.

9. The exhaust gas system according to claim 8, characterized in that upstream of a second of the converters a plurality of exhaust gas temperature controlling devices is arranged in series.

10. The exhaust gas system according to claim 8, characterized in that the cooling device includes a heat exchanger.

11. The exhaust gas system according to claim 8, characterized in that the heating device is an electrical heating device, a thermal storage heating device or a separate, preceding converter which warms up when exhaust gas flows through it.

12. A method of directing a flow of exhaust gas in an exhaust gas system of a vehicular internal combustion engine, the exhaust gas system having an exhaust gas conduit emanating from the side of the engine and a plurality of exhaust gas catalytic converters arranged in the exhaust gas conduit, the exhaust gas catalytic converters having graduated working temperature ranges with overlapping limiting ranges, and at least one pilot valve, characterized by the following steps:

switching the pilot valve in such a manner that the exhaust gas is directed into the one of the exhaust gas converters into whose working temperature range the exhaust gas temperature falls, intermediate, short-term heating-up of at least one of the exhaust gas converters not currently used for exhaust gas cleaning so as to bring it up to a temperature approximating its working temperature.

13. The method of claim 12, characterized in that after a start-up phase, the exhaust gas converter not currently involved in the exhaust gas cleaning, is kept at its working temperature by directing exhaust gas through it for at least a short period of time.

14. The method according to claim 12, characterized in that whenever an exhaust gas converter flooded with exhaust gas reaches a predetermined temperature, as from which the $NO_x$ reduction decreases, the pilot valve is actuated and exhaust gas is directed to a cooler exhaust gas converter.

* * * * *